Aug. 11, 1931.                J. H. HUNTER                    1,818,625
                          CONDUIT SECURING MEANS
                            Filed April 13, 1925
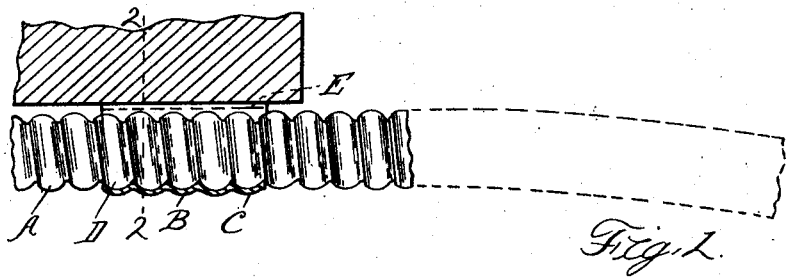
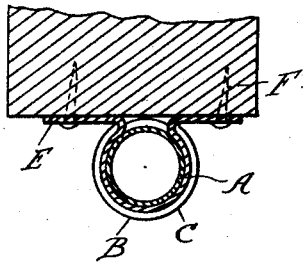
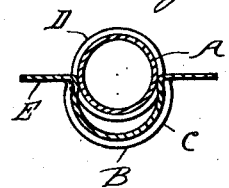
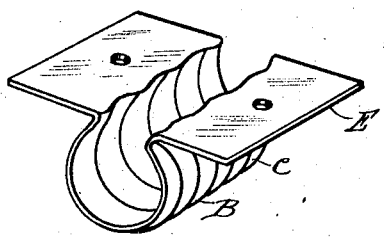
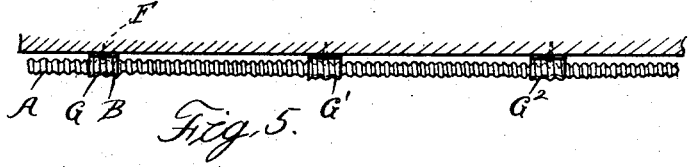
Inventor
Joseph H. Hunter.
By Whittemore Hulbert Whittemore
   Belknap    Attorneys Patented Aug. 11, 1931

1,818,625

UNITED STATES PATENT OFFICE

JOSEPH H. HUNTER, OF DETROIT, MICHIGAN, ASSIGNOR, BY MESNE ASSIGNMENTS, TO GENERAL CABLE CORPORATION, A CORPORATION OF NEW JERSEY

CONDUIT SECURING MEANS

Application filed April 13, 1925. Serial No. 22,850.

The invention relates to flexible metallic conduits more particularly designed for holding electrical conductors, and the invention consists in the novel means for securing such conduits, as hereinafter set forth.

In the drawings:

Figure 1 is a sectional elevation showing a portion of the conduit and the securing means therefor;

Figure 2 is a cross-section on line 2—2 of Fig. 1;

Figure 3 is a similar view showing the manner of engaging the securing clips to the conduit;

Figure 4 is a perspective view of one of the securing clips;

Figure 5 is an elevation showing a length of the conduit with a series of securing clips in engagement therewith, but not fastened to the supporting structure.

In the present state of the art one type of flexible conduit which is extensively used is formed from a spirally wound strip of sheet metal so fashioned that the adjacent convolutions will interlock but permit of a limited relatively angular movement. In installing such conduits it is the usual practice to secure them to the frame of the building or other structure by staples or clips, which are placed at suitable intervals. After the conduit is thus once secured, if there is any requirement for adjustment, it is usually necessary to loosen the clips or securing devices before such adjustment can be made.

My improvement consists essentially in a securing clip which is fashioned to provide a screw threaded engagement with the spiral of the conduit such that after the clip is secured to the supporting structure, the conduit may still be adjusted longitudinally in relation thereto. Thus as shown in Figs. 1 and 2, the conduit A has engaged therewith the clip B having the spiral corrugations C therein, which fit the corresponding corrugations D of the conduit. The clip preferably extends more than half way around the conduit and is made of resilient metal so that it may be snapped into engagement therewith. E are laterally extending flanges on opposite sides of the clip, which are apertured for the nails or other securing devices F.

With this construction the workman may engage a series of clips with the conduit, as shown at G, G', G² spaced approximately in proper positions, and these clips may then be successively attached to the supporting structure. If any of the clips are not exactly spaced as desired, they may be adjusted by revolving the same upon the conduit before the securing nails are engaged therewith. Again, after the clips are secured in position, if there is any need of adjusting the conduit, as for instance where one end projects from the last securing clip a greater distance than the other end, the whole conduit may be adjusted longitudinally by revolving the same. Still another advantage is that the clips hold the conduit from any longitudinal movement excepting where there is also a rotary movement. This prevents any sagging of the conduit due to its weight, which might occur if the clips were a considerable distance apart and the conduit free to move longitudinally therein.

Finally the snap engagement of the clips with the conduit retains them in position so that the operator's hands are free to engage the nails or other securing devices without the necessity of holding the clip in position.

What I claim as my invention is:

1. A securing device for a spirally corrugated conduit comprising a member having a curved portion adapted to embrace the conduit at a point intermediate its ends, the curved portion of said member being provided with corrugations providing for unobstructed threaded engagement between the member and the conduit, and means for securing said member to a support while maintaining said conduit in spaced relation to said support whereby said conduit may be rotated within said member for axial adjustment relative thereto.

2. A securing device for a spirally corrugated conduit comprising a resilient clip adapted to have a snap-on engagement with said conduit and adapted to embrace more than one half the cross section of the conduit, said clip having corrugations to provide for an unobstructed threaded engagement of the conduit with the clip whereby the clip and conduit may be adjusted relative to each other upon rotation of the one relative to the other, and means for securing said clip to a support.

In testimony whereof I affix my signature.

JOSEPH H. HUNTER.